350-96.23
8/12/86    SR    XR    4,605,818

United States Patent [19]
Arroyo et al.

[11] Patent Number: 4,605,818
[45] Date of Patent: Aug. 12, 1986

[54] FLAME-RESISTANT PLENUM CABLE AND METHODS OF MAKING

[75] Inventors: Candido J. Arroyo, Lilburn; Nicholas J. Cogelia, Duluth; Palmer D. Thomas, Tucker, all of Ga.

[73] Assignees: AT&T Technologies, Inc., Berkeley Heights; AT&T- Bell Laboratories, Murray Hill, both of N.J.

[21] Appl. No.: 626,085

[22] Filed: Jun. 29, 1984

[51] Int. Cl.⁴ ............................ H01B 7/02; H01B 7/22
[52] U.S. Cl. ........................................ 174/107; 156/54; 156/56; 174/113 R; 174/121 A; 174/121 SR; 350/96.23
[58] Field of Search ............. 174/107, 121 A, 121 SR, 174/121 R, 122 G, 110 FC, 113 R; 156/54, 56; 350/96.23

[56] References Cited
U.S. PATENT DOCUMENTS

| | | | |
|---|---|---|---|
| 2,691,694 | 10/1954 | Young | 174/121 R |
| 3,265,808 | 8/1966 | Binch | 174/121 A X |
| 3,425,865 | 2/1969 | Shelton, Jr. | 156/56 |
| 3,509,269 | 4/1970 | Elliott | 174/107 |
| 3,823,255 | 7/1974 | La Gase et al. | 174/121 A X |
| 3,903,354 | 9/1975 | Dageford | 174/107 |
| 4,079,191 | 3/1978 | Robertson et al. | 174/121 A X |
| 4,134,953 | 1/1979 | Dembiak | 264/174 |
| 4,150,249 | 4/1979 | Pedersen | 174/36 |
| 4,151,366 | 4/1979 | Betts et al. | 174/116 |
| 4,154,976 | 5/1979 | Brorein | 174/115 |
| 4,284,842 | 4/1981 | Arroyo et al. | 174/107 |
| 4,319,940 | 3/1982 | Arroyo et al. | 156/56 |
| 4,327,001 | 4/1982 | West et al. | 524/322 |
| 4,401,845 | 8/1983 | Odhner et al. | 174/113 R |
| 4,510,348 | 4/1985 | Arroyo et al. | 174/121 R |

FOREIGN PATENT DOCUMENTS 2050041 12/1980 United Kingdom ............ 174/121 A

OTHER PUBLICATIONS

Dukert, A. A.; Characteristics of Kynar Polyvinylidene Fluoride as an Insulating Material; Wire and Wire Products; Feb. 1964.
Paper E. W. Fasig, Jr. et al. "Performance of Fluoropolymer Wire and Cable Insulation in Large-Scale Tests for Flammability, Smoke Corrosive Off-Gases and Circuit Integrity" 26th Intl. Wire & Cable Smyposium, Nov. 16, 1977.
DuPont brochure "Plenum Cable of TEFLON® FEP".
Application Ser. No. 518,582 filed 7/29/83—C. J. Arroyo et al.
Application Ser. No. 479,249 filed 3/28/83—C. J. Arroyo et al.
Pennwalt brochure "Kynar® for Electrical/Electronic applications now/ul classified for Plenum Cable use".

*Primary Examiner*—A. C. Prescott
*Assistant Examiner*—Morris H. Nimmo
*Attorney, Agent, or Firm*—E. W. Somers

[57] ABSTRACT

A relatively small pair size cable (20) comprising at least one conductor (22) which is insulated with polyvinyl chloride plastic material is provided with a flame retardant, smoke suppressive sheath system (30). The sheath system has a relatively low thermal conductivity and provides a predetermined delay prior to the thermal decomposition of the conductor insulation. It includes a layer (31) of an impregnated woven glass material which has an air permeability that is sufficiently low to minimize gaseous flow through the layer of woven glass material and to delay heat transfer to the core for a predetermined time. The woven glass layer is wrapped about the core to have a longitudinal overlapped seam and is enclosed by an outer jacket (40) of a fluoropolymer plastic material which is extruded about the woven layer.

17 Claims, 8 Drawing Figures

_Fig_4

_Fig_3

FLAME-RESISTANT PLENUM CABLE AND METHODS OF MAKING

TECHNICAL FIELD

This invention relates to a plenum cable having resistance to flame spread and smoke evolution and to methods of making it. More particularly, it relates to a relatively small pair size cable which is suitable for communications use, for example, in building plenums and which includes an outer jacket which is made of an extrudable material.

BACKGROUND OF THE INVENTION

In the construction of many buildings, a finished ceiling, which is referred to as a drop ceiling, is spaced below a structural floor panel that is constructed of concrete, for example. Light fixtures as well as other items appear below the drop ceiling. The space between the ceiling and the structural floor from which it is suspended serves as a return-air plenum for elements of heating and cooling systems as well as a convenient location for the installation of communications cables including those for computers and alarm systems. It is not uncommon for these plenums to be continuous throughout the length and width of each floor.

When a fire occurs in an area between a floor and a drop ceiling, it may be contained by walls and other building elements which enclose that area. However, if and when the fire reaches the plenum, and if flammable material occupies the plenum, the fire can spread quickly throughout an entire story of the building and smoke can be conveyed through the plenum to adjacent areas. The fire could travel along the length of cables which are installed in the plenum.

Generally, a cable sheath which encloses a core and which comprises only a vinyl plastic jacket does not exhibit what are now totally acceptable flame spread and smoke evolution properties. As the temperature in such a cable rises, charring of the jacket material begins. Afterwards, conductor insulation inside the jacket begins to decompose and char. If the jacket char retains its integrity, it functions to insulate the core; if not, it is ruptured by the expanding insulation char, exposing the virgin interior of the jacket and insulation to elevated temperatures. The jacket and the insulation char begin to pyrolize and emit flammable gases. These gases ignite and, because of air drafts within the plenum, burn beyond the area of flame impingement, propagating flame and evolving smoke.

In order to thwart flame spread and smoke evolution, the National Electric Code (NEC) requires that power limited cables in plenums be enclosed in metal conduits. The initial cost of rigid metal conduits for communications cables, for example, in plenums is relatively expensive. However, the Code permits certain exceptions to this requirement. For example, flame-resistant, low smoke-producing cables without metallic conduit are permitted, provided that such cables are tested and approved by an authority such as the Underwriters' Laboratories. What is needed for use in buildings is a cable which is relatively inexpensive to manufacture, but which meets the NEC requirements for flame retardance and smoke evolution, and which has suitable mechanical properties such as flexibility.

The prior art includes a cable which comprises a core enclosed in a paper wrap and in a relatively thick metallic shield but it is relatively inflexible and somewhat difficult to maneuver in plenums. Also, care must be taken during installation to guard against possible electrical shock which may be caused by the metallic shield of the above-described cable engaging exposed electrical service wires or equipment. One commercially available fluorine-containing polymer material has been accepted as the primary insulative covering for conductors and as a jacketing material for plenum cable without the use of metal conduit. However, that material has a relatively high dielectric constant which makes it unattractive as insulation for communications conductors.

A plenum cable that has superior resistance to flame spread and smoke evolution is shown in U.S. Pat. No. 4,284,842 which issued on Aug. 18, 1981 in the names of C. J. Arroyo, N. J. Cogelia and R. J Darsey and which is incorporated by reference hereinto. It includes a reflective sheath system which encloses a core and which comprises a layer that is made of a thermal core wrap material and a corrugated metallic barrier having longitudinal edge portions that form a seam. The metallic barrier which reflects radiant heat outwardly is covered with two translucent tapes. Each tape is wrapped helically about the metallic barrier with overlapped sealed seams.

The foregoing sheath system, which depends on its reflection characteristics to keep the heat away from the core is well suited to larger pair size plenum cables. However, for smaller pair size cables such as those containing twenty-five pairs or less, the use of a corrugated metallic shield is not only expensive, but is somewhat difficult to form about the core. Also, inasmuch as the metallic barrier reflects heat, manufacturing line speeds must be low enough to allow sufficient heat energy to be transferred to adhesive on the tapes to seal the seams.

In one prior art small pair size cable, the core is protected by a non-metallic sheath system having a relatively low thermal conductivity. See application Ser. No. 518,582 filed July 29, 1983, in the names of C. J. Arroyo et al now abandoned. The sheath system includes an inner layer of a fibrous material, which has a relatively low thermal conductivity and a relatively high heat absorptivity, and a woven glass layer which is impregnated with a fluorocarbon resin material and which is wrapped helically about the core. Although the sheath system provides excellent results, the fibrous material is difficult to form about a cable having only several pairs of conductors.

What is still sought is a less expensive, flame retardant, smoke suppressive sheath system for a relatively small pair size plenum cable. The sought-after cable desirably is easier to manufacture than presently available products and includes a core wrap material that is capable of being wrapped easily about the core.

SUMMARY OF THE INVENTION

The foregoing needs have been met by the cable of this invention which includes a core comprising at least one insulated conductor that may be a metallic or a lightguide fiber conductor. The cable is protected by a nonmetallic sheath system having a relatively low thermal conductivity. Such a sheath system is effective to provide a predetermined time delay before any thermal decomposition of the conductor insulation when the cable is subjected to relatively high temperatures. More particularly, the sheath system includes an inner layer of a woven material which encloses the core. The woven inner layer has an air permeability which is sufficiently low to minimize gaseous flow through the woven inner layer and to delay heat transfer to the core for a predetermined time. The inner layer is formed to have a longitudinal overlapped seam. An outer jacket of an extrudable plastic material encloses the layer of woven material. In a preferred embodiment, a woven glass layer which is impregnated with a fluorocarbon resin is interposed between the core and the outer jacket which comprises a fluorinated resin plastic material. After the outer jacket decomposes, this layer helps to eliminate substantially the ingress of hot air and the egress of pyrolytic gases from the conductor insulation to prevent further ignition at the flame front. In another embodiment which provides electrical shielding capabilities for the cable, a laminate comprising a relatively thin metallic foil and a woven glass is interposed between the impregnated woven glass layer and the jacket.

Flame retardance and smoke suppression are achieved through the superior heat resistance to high temperatures provided by the extruded outer jacket. Also contributing to the aforementioned properties of flame retardance and smoke suppression is the woven glass layer which has an air permeability that falls in a predetermined range.

The cable of this invention is particularly useful in providing a desired degree of flame retardance for lightguide fiber cables and for small pair size cables which generally include less than twenty-five pairs of insulated metallic conductors. Inasmuch as the only shield which may be used in the cable is a relatively thin metallic foil, the cable is highly flexible, thereby facilitating installation. Another advantage of this cable relates to its manufacture. In at least one prior art cable, the sheath system included a tape which was wrapped helically about a layer of fibrous material. The tape which forms the core wrap of the cable of this invention is not wrapped helically because it would unduly compress the core and thereby mitigate against the charring effect of the conductor insulation. Rather, the woven glass tape is wrapped longitudinally about the core and an outer layer of a fluoropolymer material such as polyvinylidene fluoride plastic material is extruded over the inner layer with conventional tooling.

BRIEF DESCRIPTION OF THE DRAWINGS

Other features of the present invention will be more readily understood from the following description of specific embodiments thereof when read in conjunction with the accompanying drawings in which.

DETAILED DESCRIPTION

Figure 1:
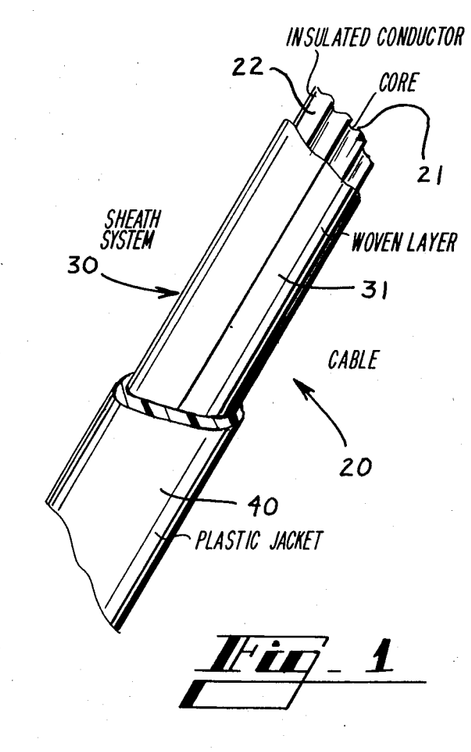
FIG. 1 is a perspective view of a cable of this invention which includes a sheath system that has superior flame and smoke retardance properties.
Figure 2:
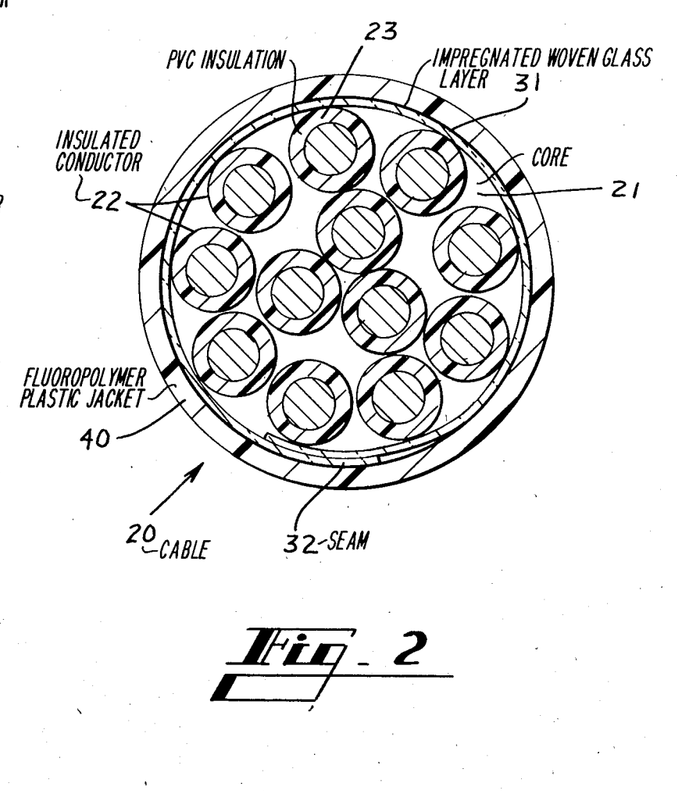
FIG. 2 is an end view of the cable sheath system of this invention.

Referring now to FIGS. 1 and 2, there is shown a communications cable, which is designated generally by the numeral 20 and which is flame retardant and smoke suppressive. It includes a core 21 having no more than twenty-five pairs of individually insulated conductors 22—22. Generally, insulation 23 which covers each of the conductors of the core is a flame retardant plastic material such as, for example, a polyvinyl chloride (PVC) composition. The core 21 could be one which is suitable for use in computer and alarm signalling networks as well as in voice communications.

Figure 3:
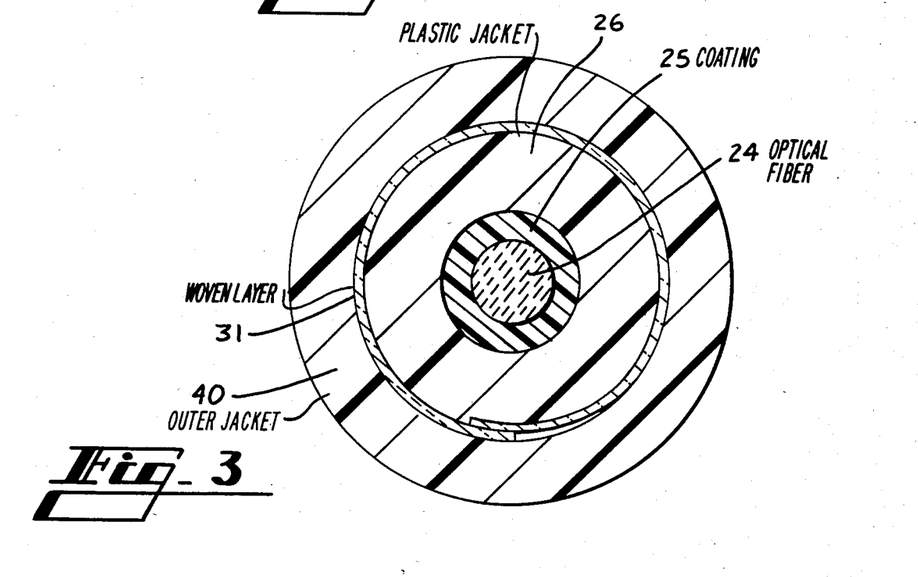
FIG. 3 is an end cross-sectional view of a lightguide cable which embodies the cable sheath system of FIG. 1.

It should be realized that the core 21 also may be one which is used in lightwave communications. As such, it could include a single lightguide fiber 24 (see FIG. 3) which is coated with a protective material 25 and enclosed in a sheath that includes strength members and a fire retardant plastic jacket 26. Depending on the structure of the conductors themselves, such a cable may have a lower fuel content than a cable which includes insulated metallic conductors.

Figure 4:
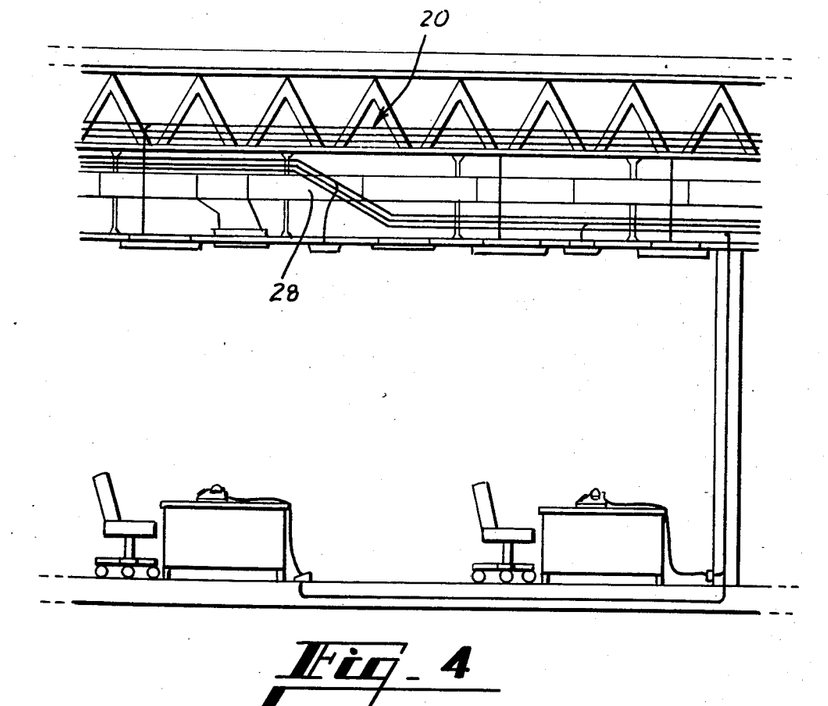
FIG. 4 is an elevational view of a portion of a building to show an environment in which the cable of this invention may be used.

As should become apparent from test results disclosed hereinafter, the cable 20 of this invention satisfies a long felt need for a relatively small pair size cable which is specially suited for use in a building plenum 28 (see FIG. 4). Such a cable must meet stringent requirements for flame spread and smoke evolution as well as those for mechanical and electrical safety. Although some plenum cables may include twenty-five or more conductor pairs, many such cables include as few as six, four or even two conductor pairs.

Turning again to the cable of this invention as shown in FIGS. 1–2, it can be seen that the core 21 is enclosed with a sheath system 30. The sheath system 30 which is non-metallic and which is characterized by a relatively low thermal conductivity delays for a predetermined time heat transfer into the core 21. Typical of the thermal conductivity values of the components of the sheath system 30 are those in the range of about 0.0001 to 0.0006 cal.cm/cm$^2$ sec.°C.

As can be seen in the drawing, the sheath system 30 includes a core wrap or inner layer 31 which comprises a heat resistant, woven material. The woven inner layer 31 is comprised of two sets of yarns, warp and filling formed by weaving, which is the interlacing of these sets of yarns to form a fabric. Warp is defined as the set of yarn in all woven fibers, that runs lengthwise and parallel to the selvage and is interwoven with the filling. The filling in the yarn runs from selvage to selvage at right angles to the warp. The warp and filling members determine the window in the woven glass and thereby are partially determinative of the air permeability of the woven glass.

The inner layer 31 is disposed loosely about the core so that the PVC conductor insulation 23 is capable of expanding when it intumesces under the application of heat. To avoid unduly compressing the core, the woven glass layer 31 is wrapped longitudinally about the core 21 instead of helically with an overlapped seam 32 which has a width of about 0.13 inch. During a fire, the core chars. If this char is not allowed to develop, it cracks and substantial amounts of gases are emitted. Desirably, the core wrap 31 conforms to the growth of the char and allows it to develop. Inasmuch as the core is not wound tightly with the core wrap, the PVC conductor insulation is allowed to char and expand and to suppress smoke to minimize flame advance. As a result, the underlying uncharred PVC insulation is further insulated from the heat.

The woven glass layer 31 of the preferred embodiment is impregnated with a fluorocarbon resin material. The woven glass layer 31 is formed from a raw glass tape which has a thickness of 0.002 inch and a weight of 1.4 ounces per square yard. The glass tape is one marketed by Burlington Industries and designated 108 woven glass. It has a warp of 60 and a fill of 47. The fluorocarbon resin may be a polytetrafluoroethylene (PTFE) resin, for example, which is available from the E. I. duPont Company. A woven glass strip which has been impregnated with the PTFE resin is available commercially from the Oak Material Group, Inc. under the designation Fluorglas ® tape. After impregnation, the thickness increases. The thickness of the impregnated woven glass layer 31 varies between 0.0025 to 0.003 inch. For a core of one to five conductor pairs, it is 0.0025 inch; for cores of six pairs or more, it is 0.003 inch.

The impregnated woven glass tape which is formed into the layer 31 has a width which is dependent on the number of conductor pairs in the core. For a two pair core, the width is 0.5 inch, for four pair, 0.625 inch and for 25 pairs, 0.875 inch.

The woven inner layer may be characterized by its air permeability. Air permeability of a material is defined as the rate of air flow through the material under a given differential pressure. Because the layer 31 is woven and because the resin fills the interstices of the woven glass, the layer is characterized by an air permeability which is sufficiently low to minimize the ingress of hot air into the core and to delay heat transfer to the core for a predetermined time. The air permeability of the impregnated woven glass layer is in the range of about 0 to 35 cfm.

It has been determined that a relatively low air permeability of the core wrap is at least as important to a plenum cable as is a low thermal conductivity of the core wrap. This is a surprising result. The reduction of the flow of hot air and pyrolytic gases provides improved flame retardance and smoke suppression properties in small pair size cables. Because of its air permeability, the inner layer 31 impedes the flow of convective hot air inwardly toward the core. Also, once the core 21 begins to degrade during a fire, the layer 31 impedes the outward flow of pyrolytic gases from the decomposed PVC which ignite and contribute to flame spread. Further, after the jacket 40 has been decomposed, the woven glass layer 31 is effective to delay heat transfer to the core for a predetermined time.

The air permeability is a function of the size of the window formed between adjacent warping and filling, of the degree of impregnation, and of the amount of air entrapped in the woven material during impregnation. In order to provide an air permeability which is sufficiently low to minimize gaseous flow through the sheath system, the degree of impregnation employed is a function of the number of conductor pairs in the cable. In a preferred embodiment, the raw glass tape is impregnated with a fluorocarbon resin which for six or more pairs is about 70% by weight of the tape. This may be decreased as the pairs decrease. For less than six pairs, the fluorocarbon resin is about 30% by weight of the tape.

The amount of air entrapped in the woven layer 31 during impregnation affects thermal conductivity as well as air permeability. As the degree of impregnation decreases, the amount of air entrapped increases. As the amount of air entrapped increases, the thermal conductivity decreases. For higher pair count cables, the 70% by weight impregnation results in a higher thermal conductivity but a lower air permability than for a lower pair count cable in which there is 30% by weight impregnation, for example.

To provide thermomechanical and dielectric strength, the cable sheath system 30 includes an outer jacket 40 (see FIGS. 1 and 2). This is made of a fluoropolymer plastic material comprising a fluorinated polymer including fluoride ions in the polymer chain. The fluoropolymer plastic material can withstand relatively high temperatures without degradation and is capable of being extruded. In the preferred embodiment, the outer jacket 40 comprises a polyvinylidene fluoride (PVDF) material such as KYNAR ®PVDF material. Such a material which is transparent to translucent is described in a brochure designated PL-148-A-3/81-W77020-5M published by the Pennwalt Corporation of Philadelphia, Pa. The thermal conductivity of the material of the outer jacket 40 is in the range of about 0.00024–0.0003 cal. cm/cm$^2$°C. It has a specific heat of 0.30–0.34 cal./gm/°C. and a limiting oxygen index of about 40%. Its initial thermal decomposition occurs above 350° C.

The components of the sheath system 30 cooperate to provide a system which delays the transfer of heat energy into the core 21 for a predetermined time. Because conductive heat transfer, which decomposes the conductor insulation 23, is delayed, smoke emission and hence further flame spread are controlled. This heat energy, at least for a predetermined time, is controlled by the sheath system comprising the woven core wrap and the jacket.

Figure 5:
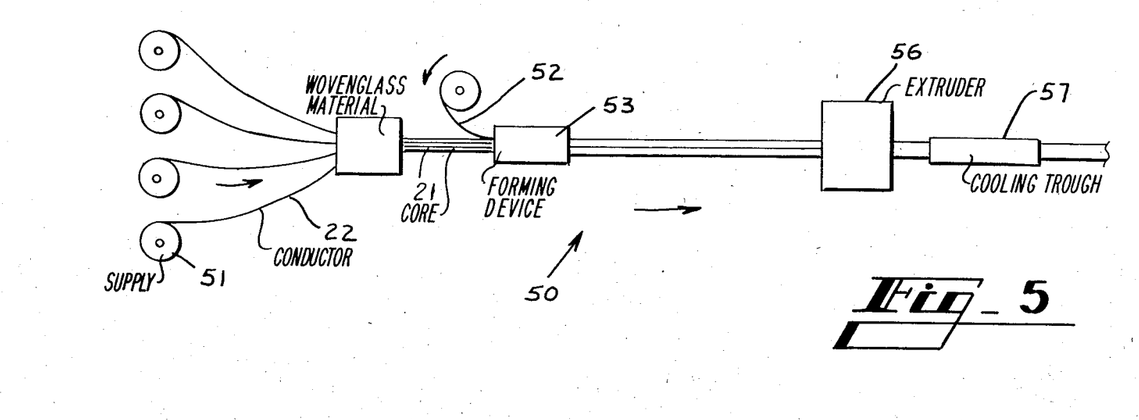
FIG. 5 is a schematic view of a portion of a manufacturing line which is used to make the cable of this invention.

In the manufacture of the cable 20, a core 21 which may comprise the plurality of conductors 22—22 is advanced along a line 50 (see FIG. 5). The conductors 22—22 are payed off from supplies 51—51. A strip 52 of woven glass material is wrapped longitudinally about the core 21 by a device 53 to form the layer 31. The layer 31 presents a relatively smooth surface over which the jacket material is extruded. Notching of the fluoropolymer plastic material is minimized because of the relatively thin inner layer.

It has been found that the tightness of the enclosure of the sheath system, which comprises the inner layer 31 and the extruded jacket 40, about the core, affects the amount of char that is formed, and could increase the evolution of smoke. Accordingly, care must be taken when extruding the outer jacket about the core to avoid undue compression of the inner layer 31. If this precautionary measure were not taken, the layer 31 would be compressed so much during manufacture that its effectiveness as a thermal barrier would be reduced. Also, the PVC charring mechanism would be restricted, and this would lead to the emission of volatile gases which might escape through the seam 32 and ignite downstream.

Afterwards, the wrapped core is advanced through an extruder 56 wherein an outer jacket of a fluoropolymer material such as KYNAR ® plastic material is caused to enclose the wrapped core. The jacketed cable is advanced through a trough 57 wherein it is cooled by chilled water. The completed plenum cable is taken up on a reel (not shown).

Figure 6:
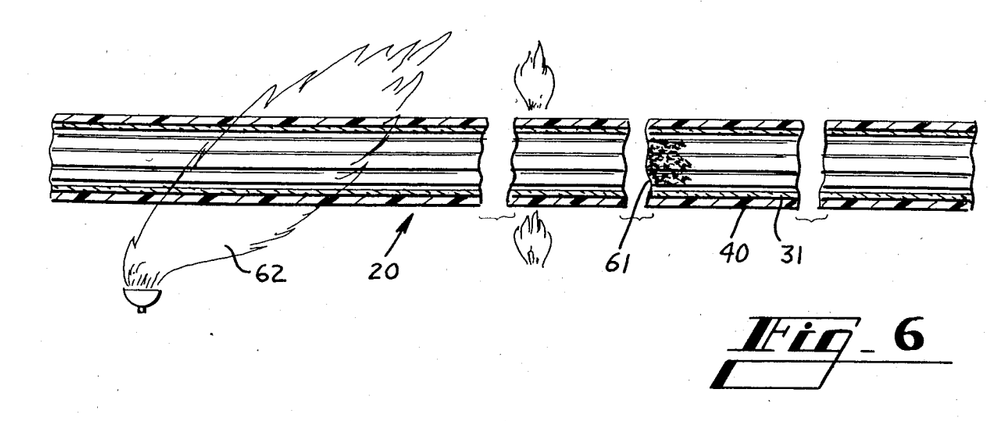
FIG. 6 is an elevational view of a portion of a length of cable being subjected to a flame in a test apparatus.

Flame spread and smoke evolution characteristics of sample cables may be demonstrated by using a well known Steiner Tunnel test in accordance with A.S.T.M. E-84 as modified for communications cables and now referred to as Underwriters' Laboratories Test U.L. 910. Test 910 is a test method for determining the relative flame propagation and smoke generating characteristics of cable to be installed in ducts, plenums, and other spaces used for environmental air. Tests have shown that heat is transferred to the cable core 21 principally by thermal radiation, secondly by conduction and finally by convection. The charring of the PVC insulation along its outwardly facing surface acts to inhibit further degradation of the PVC by blocking internal convective air movements. Charred PVC conductor insulation 61 (see FIG. 6) effectively blocks off a section of the length of cable 20 to localize further PVC decomposition in the portion of the cable adjacent to a flame 62. This prevents the longitudinal travel of heated air which decomposes the insulation and causes smoke evolution.

In the Underwriters' Laboratories tests, a flame is drawn across the surface of a plenum cable. When the jacket is degraded, only the core wrap remains. It must delay and eliminate the hot air from breaking down the core. Because it is glass, the core wrap retains its integrity. Further, when the core does break down, the glass keeps the evolved gases inside and causes them to flow longitudinally within and along the cable instead of flowing to the outside of the cable and fueling the flame front. Further, as the fluorocarbon resin of the woven glass layer 31 melts, it seals the longitudinal seam along the cable thereby creating a glass conduit around the core.

EXAMPLE

A core comprising four pairs of 24 gauge copper conductors individually insulated with a PVC insulation having a thickness of about 0.006 inch was enclosed in a woven glass strip having a longitudinal overlapped seam. The woven glass strip had been impregnated with a polytetrafluoroethylene resin and had a thickness of 0.0025 inch and a width of 0.625 inch. The impregnation was such that the fluorocarbon resin had a weight of about 30% of the weight of the woven glass strip. The woven glass strip had an air permeability of 32 cfm and a thermal conductivity of 0.00014 cal. cm/cm$^2$sec°C. for woven glass to 0.00059 for PTFE. Then a 0.015 inch thick jacket comprising KYNAR ® plastic material was extruded about the wrapped core.

This cable was subjected to tests in a Steiner Tunnel in accordance with priorly mentioned Underwriters' Laboratories test UL 910 and exposed to temperatures of 904° C., or incident heat fluxes as high as 6.3 watts/cm$^2$. Cables (1)–(4) having other constructions were tested and are tabulated below in Table 1 with cables (5)–(8) being cables of this invention.

TABLE 1

| Cable Description | Core Wrap | Insul. | Air Perm. of Core Wrap (CFM) | No. Cables Tested | Pairs | Flame Spread (Ft) | Peak Optical Density |
| --- | --- | --- | --- | --- | --- | --- | --- |
| (1) Standard Inside Wiring PVC Jacket | None | PVC | | 24 | 25 | 14 | 3.0 |
| (2) PVC Jacket in Conduit | | PVC | | 10 | 25 | 3.0 | 0.30 |
| (3) TEFLON ® -FEP Plastic | Glass/PTFE | TEFLON ® FEP | 32 | 18 | 25 | 3.0 | 0.35 |
| (4) KAPTON ® Tapes Plus 0.020 cm Aluminum | Glass | PVC | 0 | 24 | 25 | 4.5 | 0.33 |
| (5) KYNAR ® PVDF Jacket | Glass/PTFE | PVC | 0 | 55 | 6 | 2.5 | 0.30 |
| (6) KYNAR ® PVDF Jacket | Glass/PTFE | | 32 | 63 | 4 | 2.7 | 0.36 |
| (7) KYNAR ® PVDF Jacket | Glass/PTFE | | 32 | 73 | 3 | 2.5 | 0.32 |
| (8) KYNAR ® PVDF Jacket | Glass/PTFE | | 32 | 80 | 2 | 2.3 | 0.38 |
| (9) UL Test 910 requirements (Max) | | | | | | 5.0 | 0.50 |

As can be seen in Table 1, the cable 20 of this invention has properties which compare favorably with the PVC cable in a metal conduit and the TEFLON ®-FEP plastic jacketed cable. Not only does it provide very acceptable flame spread protection, but also it is characterized by its ability to inhibit the evolution of smoke. A measure of smoke evolution is termed optical density which is an obscuration measurement over a length of time as seen by an optical detector. The lower the optical density, the lower and hence the more desirable is the smoke characteristic. Typical peak optical density values are 0.30–0.38 for PVC insulated and jacketed cable in metal conduit, 0.1–0.35 for TEFLON ® plastic covered cables and 0.30 to 0.38 for the cable 20 of this invention.

The sheath system 30 of this invention (a) delays the transfer of conducted heat to the core 21 which produces less PVC insulation deterioration which in turn produces less smoke and therefore less flame spread; (b) effectively absorbs the radiant energy present throughout the length of the UL tunnel test; (c) eliminates premature ignition at the overlapped seams; and (d) allows the PVC insulation to char fully thereby blocking convective pyrolytic gas flow along the cable length.

In another embodiment, a cable 70 (see FIG. 7) of this invention includes provisions for shielding the cable from stray electromagnetic fields, for example. The cable 70 includes a core 72 comprising a plurality of conductors 73—73, each insulated with a polyvinyl chloride composition, and a layer 74 of woven glass which is wrapped about the core to form a longitudinal overlapped seam 76. As in the embodiment shown in FIGS. 1 and 2, the woven glass layer 74 is impregnated with a plastic material, preferably a fluorocarbon resin.

Figure 7:
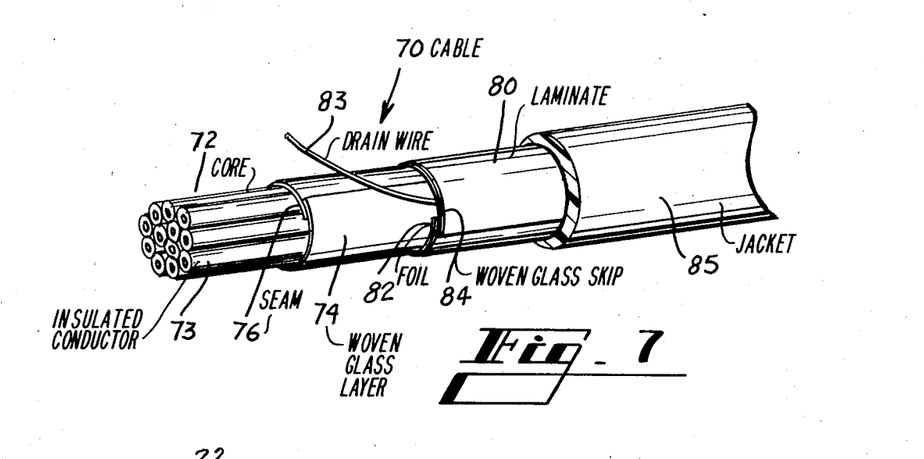
FIG. 7 is an alternative embodiment of a cable of this invention.

Shielding for the cable 70 is provided by a flexible laminate 80 which comprises a relatively thin metallic foil 82 and a woven glass strip 84. The cable 70 is arranged so that the foil 82 faces inwardly whereas the woven glass strip 84 faces outwardly. The woven glass strip 84 which is not impregnated is made of a glass marketed by Burlington Industries under the designation 1080. The warp and filling are 60 and 47, respectively, the weight is 1.4 ounces per square yard, and the thickness is 0.002 inch. Further, the woven glass strip 84 is laminated to the metallic foil 82 which is made of aluminum 0.002 inch thick. The laminate 80 is enclosed with a jacket 85 which is made of a fluorocarbon material such as the KYNAR ®PVDF plastic material. A stranded 24 gauge electrical drain wire 83 is disposed between the metallic foil 82 and the woven layer 74 to provide electrical continuity. In addition to its thermal properties, the woven glass layer 74 functions as a dielectric layer between the shielding laminate 80 and the core.

Figure 8:
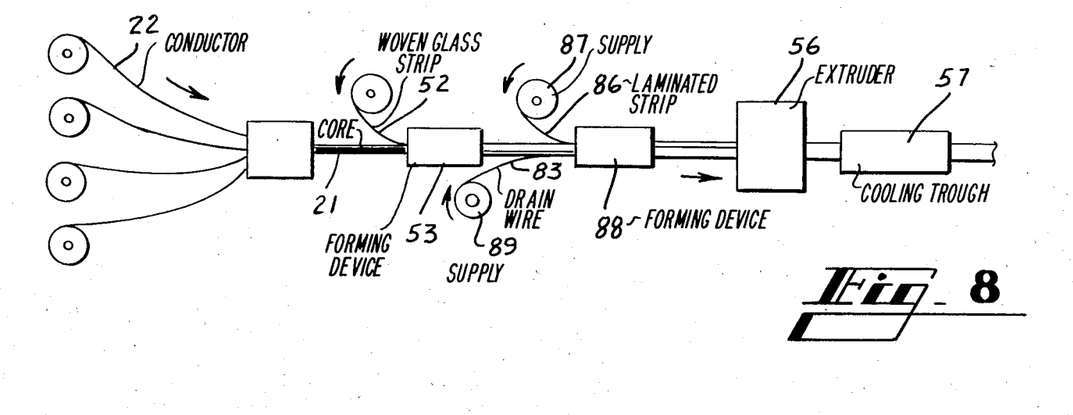
FIG. 8 is a partial view of a manufacturing line which is used to manufacture the cable shown in FIG. 7.

The cable 70 provides enhanced properties over the cable 20. Not only does it have a lower air permeability, but it also has the capability of reflecting heat energy to further protect the core. Also, because of the shielding, the degree of impregnation of the inner woven layer 74 may be less than that of the inner woven layer 31 of the cable 20. Of course, as shown in FIG. 8, the manufacture of the cable 70 requires the additional step of feeding a strip 86 of the laminate 80 from a supply 87 into a forming device 88. Also, the drain wire 83 from a supply 89 must be engaged with the layer 74 prior to the application of the strip 86. The forming device 88 causes the strip 86 to be wrapped longitudinally about the woven glass layer 74 which encloses the core 72. Then the shielded core is advanced through the extruder 56 which applies the jacket 85.

EXAMPLE

A core comprising six pairs of 24 gauge copper conductors individually insulated with a PVC insulation having a thickness of about 0.006 inch was enclosed in an inner woven glass strip having a longitudinal overlapped seam. The inner woven glass strip had been impregnated with a polytetrafluoroethylene resin and had a thickness of 0.003 inch and a width of 0.625 inch. The impregnation was such that the fluorocarbon resin had a weight of about 70% of the weight of the woven glass strip. The inner woven glass strip had an air permeability of 0 cfm and a thermal conductivity of 0.0006 cal. cm/cm$^2$sec°C. The inner woven glass strip was enclosed in a laminate comprising an aluminum layer having a thickness of 0.002 inch and an outer layer of 0.002 inch woven glass.

This cable also was subjected to tests in a Steiner Tunnel in accordance with priorly mentioned Uniterwriters' Laboratories test UL 910 and exposed to temperatures of 904° C., or incident heat fluxes as high as 6.3 watts/cm$^2$. Cables (1)–(4) having other constructions were tested and are tabulated below in Table 2 with cables (5)–(6) being cables of this invention.

TABLE 2

| Cable Description | Core Wrap | Insul. | Air Perm. of Core Wrap (CFM) | No. Cables Tested | Pair Size | Flame Spread (FT) | Peak Optical Density |
|---|---|---|---|---|---|---|---|
| (1) Standard Inside Wiring PVC Jacket | None | PVC | | 24 | 25 | 14 | 3.0 |
| (2) PVC Jacket in Conduit | | PVC | | 10 | 25 | 3.0 | 0.30 |
| (3) TEFLON ® -FEP Plastic | Glass/PTFE | TEFLON ® FEP | 32 | 18 | 25 | 3.0 | 0.35 |
| (4) KAPTON ® Tapes Plus 0.020 cm Aluminum | Glass | PVC | 0 | 24 | 25 | 4.5 | 0.33 |
| (5) KYNAR ® PVDF Jacket with shield | Glass/PTFE | PVC | 0 | 45 | 6 | 2.5 | 0.14 |
| (6) KYNAR ® PVDF Jacket with shield | Glass/PTFE | PVC | 0 | 45 | 6 | 3.0 | 0.12 |
| (7) UL Test 910 requirements (Max) | | | | | | 5.0 | 0.50 |

As can be seen from Table 2, the flame spread and peak optical density properties of the cable 70 compare favorably with those of the metallic conduit cable, for example. Moreover, the cable 70 provides protection against electromagnetic interference in particular arrangements.

It is to be understood that the above-described arrangements are simply illustrative of the invention. Other arrangements may be devised by those skilled in the art which will embody the principles of the invention and fall within the spirit and scope thereof.

What is claimed is:

1. A relatively low pair count cable which resists flame spread and smoke evolution, said cable comprising:

a core which includes at least one conductor enclosed in a plastic coating; and a sheath system which encloses said core and which has a relatively low thermal conductivity, said sheath system being effective to delay thermal decomposition of the conductor coating when the cable is subjected to a relatively high temperature and including;

a relatively thin layer of a woven material which encloses said core and which has a longitudinal overlapped seam, said layer of woven material being impregnated with the degree of impregnation being a function of the number of conductors in the core and having an air permeability in the range of about 0 to 35 cfm which is sufficiently low to minimize gaseous flow through said layer and to delay heat transfer to the core for a predetermined time; and an extruded jacket of a fluoropolymer plastic material which encloses said layer of woven material.

2. The cable of claim 1, wherein said core includes a plurality of insulated conductors and wherein each of said conductors is enclosed in an insulative covering comprising a polyvinyl chloride plastic material.

3. The cable of claim 1, wherein said layer of woven material is disposed loosely about said conductors to permit expansion of the plastic coating of the conductors when the coating is thermally decomposed.

4. The cable of claim 1, wherein said woven layer is a woven glass layer which is impregnated with a plastic material.

5. The cable of claim 4, wherein said layer of woven glass material is impregnated with a fluorocarbon resin material.

6. The cable of claim 5, wherein said woven glass layer is impregnated with a fluorocarbon resin which comprises about 70% by weight of said woven glass layer.

7. The cable of claim 6, wherein the air permeability of said layer of woven material is substantially zero cfm per square foot at a pressure of 0.02 pounds per square inch.

8. The cable of claim 6, wherein the weight of the impregnated layer of woven glass is 0.285 lbs. per square yard.

9. The cable of claim 1, wherein said core comprises less than four pairs of conductors and said woven glass layer is impregnated with a fluorocarbon resin which is about 30% by weight of said layer.

10. The cable of claim 9, wherein the air permeability of said woven glass layer is 32 cfm per square foot at a pressure of 0.02 pounds per square inch.

11. The cable of claim 9, wherein the weight of the impregnated layer of woven glass is 0.132 lbs. per square yard.

12. A relatively low pair count cable which resists flame spread and smoke evolution, said cable comprising:
   a core which includes at least one conductor enclosed in a coating of polyvinyl chloride plastic material; and
   a sheath system which encloses said core and which has a relatively low thermal conductivity, said sheath system being effective to delay thermal decomposition of the conductor coating when the cable is subjected to a relatively high temperature and including;
   a layer of a woven glass material which is disposed loosely about said core to permit expansion of the plastic coating of the conductors when it is thermally decomposed, and which has a longitudinal overlapped seam, said layer of woven material being impregnated with a plastic material and having an air permeability which falls in the range of about 0 to 35 cfm and which is sufficiently low to minimize gaseous flow through said layer and to delay heat transfer to the core for a predetermined time;
   an extruded jacket of a fluoropolymer plastic material which encloses said layer of woven material; and
   a laminate interposed between said layer of impregnated woven material and said jacket, said laminate comprising a metallic foil which faces said layer of impregnated woven material and a layer of woven material which faces said jacket.

13. The cable of claim 12, wherein said laminate is wrapped about said layer of impregnated woven material with a longitudinal overlapped seam which is displaced circumferentially from said longitudinal overlapped seam of said layer of impregnated woven material.

14. A method of making a fire retardant plenum cable, said method comprising the steps of:
   advancing a core comprising at least one conductor which is enclosed in a coating comprising a polyvinyl chloride composition along a path of travel;
   wrapping a relatively thin strip of woven glass material which is impregnated with a plastic material and which has a relatively low air permeability that falls in the range of about 0-35 cfm, and a relatively low thermal conductivity about said core without duly compressing said core to form a longitudinal overlapped seam; and
   extruding a layer of a fluoropolymer plastic material about the strip of woven glass material to form a jacket.

15. The method of claim 14, wherein the woven glass material comprises a strip of woven glass material which has been impregnated with a fluorocarbon resin.

16. The method of claim 15, wherein the degree of impregnation of the woven glass material is increased as the number of conductors in the core increases.

17. A method of making a fire retardant plenum cable, said method comprising the steps of:
   advancing a core comprising at least one conductor which is enclosed in a coating comprising a polyvinyl chloride composition along a path of travel;
   wrapping a strip of a woven glass material which has a relatively low air permeability, and a relatively low thermal conductivity about the core without unduly compressing the core to form a longitudinal overlapped seam, the woven glass material comprising a strip of woven glass material which has been impregnated with a fluorocarbon resin, the degree of impregnation of the woven glass material being increased as the number of conductors in the core increases;
   wrapping a laminate comprising a metallic foil and a layer of woven glass material about said layer of impregnated woven glass material; and
   extruding a layer of fluoropolymer plastic material about the laminate to form a jacket.

* * * * *